June 10, 1924.
J. METTLER
DEVICE FOR AUTOMATICALLY SETTING CLOCKS
Filed Feb. 3, 1922
1,497,378
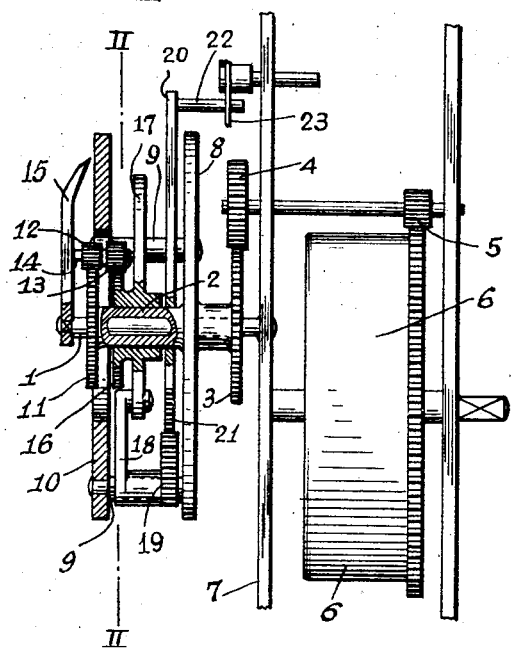
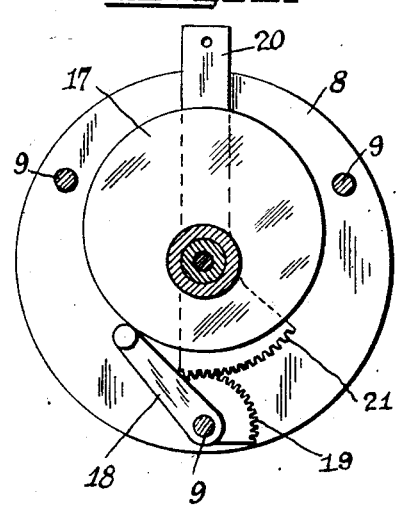
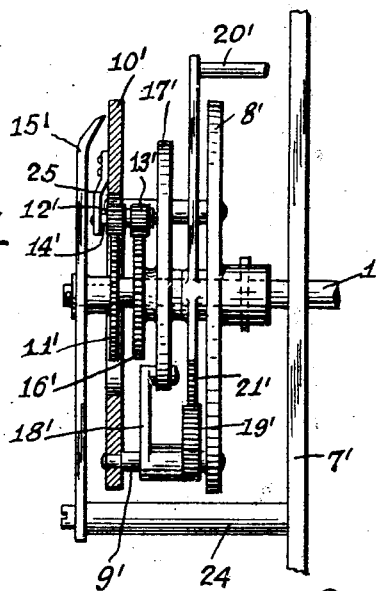
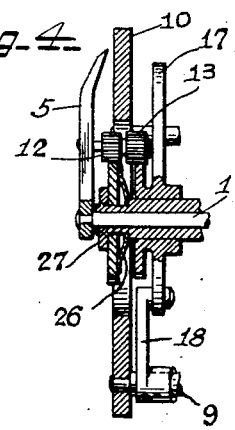
Inventor.
Josef Mettler
By B. Singer, Atty.

Patented June 10, 1924.

1,497,378

UNITED STATES PATENT OFFICE.

JOSEF METTLER, OF ZUG, SWITZERLAND, ASSIGNOR TO THE FIRM LANDIS & GYR A-G., OF ZUG, SWITZERLAND.

DEVICE FOR AUTOMATICALLY SETTING CLOCKS.

Application filed February 3, 1922. Serial No. 533,995.

*To all whom it may concern:*

Be it known that I, JOSEF METTLER, a citizen of the Swiss Republic, residing at Zug, in the Canton of Zug, Switzerland, have invented certain useful Improvements in Device for Automatically Setting Clocks (for which I have filed application for patent in Switzerland, February 2, 1921), of which the following is a full, clear, and exact description.

The invention relates to a device for altering contact hours in contact clocks in order to conform same with the hours of sun setting, or sun rising respectively, continuously altering according to the seasons of the year.

The parts essential for the invention are represented in the drawing. Fig. 1 is a partially sectioned side view of a first example of execution, Fig. 2 is a section on the line II—II of the Fig. 1. Fig. 3 is a sectional view of a modified form of the invention. Fig. 4 is a detail section, showing another modification. In the example of execution in Figs. 1 and 2 a hub 2 moves on a spindle 1 fixed to the front plate 7 of the clock-work movement, this hub 2 being driven by means of a spring in the barrel 6 and through the toothed wheel 3 and the transmission gear 4 and 5. The hub 2 makes one revolution in one day. To the hub 2 is rigidly attached a disc 8, which in turn carries by means of bolts 9, a dial 10. The latter is provided with divisions for setting the hours and months. Furthermore, a toothed wheel 11 is attached to the hub 2, this toothed wheel being in mesh with the pinion 12.

This pinion 12 is rigidly connected to a further pinion 13, and both pinions are free to turn on a spindle 14. The spindle 14 is fixed to a pointer 15 which, in turn, is rigidly attached to the spindle 1. The toothed wheel 11 has 33 teeth, the pinion 12 has 13 teeth, and the pinion 13 has 11 teeth. When the hub turns once completely round in one day, the pinions 12 and 13 make $\frac{33}{13}$ revolutions. The pinion 13 is in mesh with a toothed wheel 16 having 28 teeth, and which consequently makes $$\frac{33}{13} \times \frac{11}{28} = \frac{363}{364}$$

revs. in one day. The toothed wheel 16 makes thus in 364 days one revolution less than the dial and with the latter the curve disc 17, attached to the toothed wheel 16.

The control lever 18 has its free end arranged in contact with the periphery of the curve disc 17, this contact lever being connected to a geared sector 19, which in turn is connected with the setting lever 20, and in mesh with the geared sector 21. The setting lever 20 carries a pin 22, which operates a tripping device 23. The control lever 18, and with it the setting lever 20 make one movement to and fro in 364 days, this movement being conformed to the times of sun setting, or rising respectively, by choosing the eccentricity and the form of the curve disc 17 in a suitable manner. The described device for automatically displacing the setting hours presents a clear construction which may easily be understood, and which has only a few parts. In order to set the device to the right hours of the day, and to the right moon time, the toothed wheel 11 may be as shown in Fig. 4, free to turn on the hub 2. It is in this case pressed by a spring intermediate member 26, against a nut 27 mounted on one end of the hub 2, and thus coupled with the dial 10.

Besides the setting lever displaced by the device, there are to be provided in the usual manner further setting levers, which are not displaced automatically. A further adjustable setting lever could also be provided, this setting lever being controlled by the same or a further disc, or by the same or further control lever. The transmission gear described produces a lag of the curve disc, with reference to the dial, of one turn in 364 days. This lag should be more correctly produced in 365 days. There is consequently a certain deviation from the astronomical curve of sun setting, or rising respectively, but this deviation is so small that it may be neglected, and on the other hand the number of teeth chosen for the toothed wheel gives favourable dimensions and divisions, i. e., enables good and easy manufacture. In cases where the deviation mentioned could not be admitted, the number of teeth could be so chosen that the leading or lagging of the curve disc for one revolution is effected in exactly 365 days.

According to the Fig. 3 the device is so contructed that the toothed wheel 11' is fixed, and the spindle 14' with the dial 10' rotates. The toothed wheel 11', is mounted on the indicator 15′ which forms a bearing for the spindle 1′ and which is prevented from turning by means of a column 24 fixed to the front plate 7′. The spindle 1′ is, as the hub 2 in the first example of execution, driven by a spring. Rigidly attached to the spindle 1′ is the disc 8′, which, in turn, is connected by the bolts 9′ to the dial 10′. This spindle 14′ is connected by means of a support 25 to the dial 10′, so that the pinion 12′ rolls on the toothed wheel 11′ thus driving, through the medium of the pinion 13′ and the toothed wheel 16′, the curve disc 17′, the latter being loosely mounted on to the spindle 1′, together with the toothed wheel 16′. The curve disc thus makes one revolution in 364 days round the spindle 1′. Hereby a control lever 18′ controls the geared sectors 19′ and 21′ and a setting lever 20′ transmits the control movements to a tripping device as in the first example of execution.

In each example of execution the setting lever 20′ makes one movement to and fro daily.

The device according to the first example of execution of the invention has the remarkable advantage that it can be mounted as a unit on a clock-work, seeing that the curve disc is driven from the rotating part on which the dial is mounted. In this construction it is not necessary for the speed of the spindle of the clock-work which serves to transmit its rotation to the setting device, to be in the same transmission ratio to the speed of the spindle of the dial. The ratio of transmission necessary in each case between these two spindles can, however, be obtained by the right choice of the transmission gear between the two spindles from which the toothed wheel 3 forms a member. For this reason it is possible for the setting device to be mounted on clock-works of different types without any modification of the clock-work being necessary.

Having now particularly described and ascertained the nature of my said invention and the manner in which the same is to be performed, that which I claim is:

1. A device for automatically altering the setting times in contact clocks in which a toothed wheel mounted concentrically to the dial is in mesh with a pinion, this toothed wheel having 33 teeth, and this pinion having 11 teeth, whereby a further pinion rigidly mounted on the said pinion has 13 teeth, and a toothed wheel driven from the latter pinion and also concentrically mounted to the dial having 28 teeth.

2. A device for automatically altering the setting times in contact clocks in which a toothed wheel mounted concentrically on the dial is in mesh with a pinion, which is rigidly attached to a further pinion, this latter pinion driving a toothed wheel also mounted concentrically to the dial and to which toothed wheel a curve disc is rigidly attached.

3. A device for automatically altering the setting times in contact clocks comprising a dial, two toothed wheels mounted concentrically to the dial, and connected together by means of pinions rigidly attached to one another, one of the toothed wheels being driven through the medium of the pinion by the other toothed wheel and forming together with a curve disc a unit.

4. A device for automatically altering the setting times in contact clocks comprising two pinions rigidly attached together, a fixed spindle on which said pinions are mounted, a dial, two toothed wheels mounted concentrically to the dial, and in mesh with said pinions, one of said toothed wheels being loose, and a friction intermediate member for said loose wheel.

5. A device for automatically altering the setting times in contact clocks, comprising two pinions which rigidly are attached together, a fixed spindle on which said pinions are mounted, two toothed wheels mounted concentrically to the dial and in mesh with said pinions and of which toothed wheels the one driving the pinions is coupled by means of a spring intermediate member.

6. A device for automatically altering the setting times in contact clocks, comprising a dial, two toothed wheels mounted concentrically with the dial, a curve disc operated by one of said toothed wheels, a setting lever, a control lever operated by the curve disc and geared to the setting lever to operate the latter, a spindle revoluble with the dial and to which one of said toothed wheels is attached for rotation therewith, two pinions secured together for rotation and respectively engaging said toothed wheels.

7. Means for automatically setting contact clocks, comprising a time mechanism driven element, a setting lever, a control lever geared to the setting lever, a curve disc mounted for rotation and arranged to operate the control lever; a setting dial and a pointer, the one fixed and the other mounted for rotation by said time mechanism driven member, and gearing connecting the last named element and the said curve disc.

In witness whereof I affix my signature.

J. METTLER.